United States Patent
Dolan (10) Patent No.: US 6,973,317 B2
(45) Date of Patent: Dec. 6, 2005

(54) CALL COMPLETION BASED ON MOVEMENT OF MOBILE STATION

(75) Inventor: Tommy Dolan, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 719 days.

(21) Appl. No.: 09/740,410

(22) Filed: Dec. 18, 2000

(65) Prior Publication Data

US 2002/0077106 A1 Jun. 20, 2002

(51) Int. Cl.[7] .............................................. H04B 7/00
(52) U.S. Cl. ........................... 455/456.1; 455/432.1; 455/433; 455/456.2; 455/456.5
(58) Field of Search ................................. 455/528, 414, 455/510, 433, 458, 560, 466, 461, 453, 404.2, 455/414.3, 432, 432.1, 456.5, 456.1; 379/220.01

(56) References Cited

U.S. PATENT DOCUMENTS

| | | | | |
|---|---|---|---|---|
| 5,287,551 A | * | 2/1994 | Gustafson et al. | 455/509 |
| 5,784,438 A | * | 7/1998 | Martinez | 379/67.1 |
| 5,991,620 A | * | 11/1999 | Kingdon et al. | 455/432.3 |
| 5,995,848 A | * | 11/1999 | Nguyen | 455/528 |
| 6,070,078 A | * | 5/2000 | Camp et al. | 455/456.2 |
| 6,134,316 A | * | 10/2000 | Kallioniemi et al. | 379/220.01 |
| 6,154,644 A | * | 11/2000 | Murray | 455/414.1 |
| 6,456,842 B1 | * | 9/2002 | Subramanian et al. | 455/414.3 |
| 6,477,363 B1 | * | 11/2002 | Ayoub et al. | 455/404.2 |
| 6,631,270 B1 | * | 10/2003 | Dolan | 455/453 |

* cited by examiner

Primary Examiner—Fan Tsang
Assistant Examiner—Lisa Hashem (57) ABSTRACT

A callback service for completing a call from a calling party to a mobile station of a called party that was not previously completed due to no response. After the call was not completed due to no response, the mobile station is monitored to determine if it has moved, and when movement is determined to have occurred, a callback is initiated between the calling party and the called party. The movement is a good indication that the called party has moved the mobile station and may therefore be available to receive the call. The movement of the mobile station is preferably determined by detecting that the mobile station has changed its location utilizing mobile positioning technology. The service will generally result in more calls being completed and in their being completed in less time.

18 Claims, 5 Drawing Sheets

Fig. 5

CALL COMPLETION BASED ON MOVEMENT OF MOBILE STATION

BACKGROUND OF THE INVENTION

1. Field of the Invention

The present invention relates generally to the telecommunications field; and, more particularly, to a method and apparatus for completing a call to a mobile station in a cellular communications network that was not previously completed due to no response.

2. Description of the Prior Art

There are a variety of reasons that will prevent a telephone call from being completed. For example, when the party being called (the "called party") is a mobile subscriber, the call may fail because the called party's mobile station (MS) is inactive for some reason. For example, the MS may be turned off, its battery may be dead, or it may be located in an area that is shielded from radio reception.

In addition, in both wireless and wireline telephone systems, a call may fail because the called party is currently using his phone or MS (i.e., the line is busy); or because the called party may not be near the phone or MS, or is otherwise unable to answer the phone or MS at the time the call is made (i.e., the call is not completed due to no response).

When a telephone call is not completed, the party making the call (the "calling party") can, of course, simply hang up and call back at a later time. This is generally not a very satisfactory solution to the problem, however, as the calling party usually will not know when the circumstances that prevented the original call from being completed has been corrected or changed. As a result, it is not uncommon that the calling party may have to make several calling attempts before the call is finally completed or until he abandons the effort.

Recognizing the above problem, and in an effort to provide greater convenience to their subscribers, and to increase revenues as well; both wireline and wireless telephone service providers offer a variety of supplementary services to their subscribers. For example, both wireless and wireline systems offer voice mail services; and if the called party subscribes to such a service, an uncompleted call will be automatically routed to voice mail. A disadvantage of this service, however, is that the called party may not access his voice mail for a period of time, and this can cause problems in situations where the purpose of the call was time-sensitive.

Both wireline and wireless telephone service providers also offer various types of callback services for use in situations where a call is not completed due to the line being busy or because of no response. When the line is busy, the callback services are typically designed to effect a call back when the line is no longer busy, i.e., when the called party completes the current call and thus becomes available for the callback. This is a reasonable approach when the call is not completed because of a busy signal, because it is likely that the called party is present and available when the callback is made inasmuch as a current call has just been completed.

Such an approach is not appropriate, however, when the call was not completed due to no response. In such a situation, the probable reason that the call was not completed is that the called party is not near the phone or MS or is otherwise not available to answer the phone or MS. In order for a callback feature to be at all effective when the call was not completed due to no response, therefore, the status of the called party must first be observed and determined. Specifically, it must first be determined that the called party is, at least probably, near the phone or MS so that when the callback is made, the called party will be available for the call. One indication of the presence of the called party is that he uses his telephone or MS. When he has just used the phone or MS to make or receive a call, it is likely that he is available and the callback is automatically made as soon as he hangs up.

A disadvantage of this approach, however, is that it might be some time before the called party uses the telephone or MS. There may also be a time limit on the duration of the wait for the call to be completed, or the calling party may cancel the order to have the call completed before it can be completed.

In general, whenever a possibly successful call is not set-up, the service provider loses revenue (in systems where billing commences at B-answer). In addition, any unsuccessful attempt to complete a call also involves the use of switch and radio resources, again without any revenue being received by the service provider. Also, as indicated above, there is, at the least, substantial inconvenience to both the calling party and the called party when a desired call is not completed.

SUMMARY OF THE INVENTION

The present invention provides a call completion service for completing a call to a mobile station in the situation where a previous call is not completed due to no response (This is sometimes referred to as Call Completion on No Reply or CCNR.).

In accordance with the invention, a method is provided for completing a call from a calling party to a mobile station of a called party that was not previously completed because of no response by the called party. The method comprises the steps of determining that the mobile station of the called party has moved; and, thereafter, initiating a callback between the calling party and the called party in response to the determining step.

The present invention recognizes that when a call to a mobile station is not completed due to no response, it is usually because the subscriber cannot reach the MS while alerting is on or because the subscriber is not within hearing distance of the MS; e.g., he has left the MS in one location and has moved to another location. The present invention also recognizes that after a no response condition is encountered, if the MS moves, it is likely that the called party has moved the MS; and, accordingly, may now be close to the MS and thereby in a position to receive a call. Under such circumstance, therefore, a callback is initiated with a good possibility that the call will be completed.

According to a presently preferred embodiment of the invention, the determination that the MS has moved comprises detecting that the MS has changed its position or location; and this can be accomplished in various ways. According to a presently most preferred embodiment of the invention, for example, detection that the MS has changed its position is made utilizing mobile positioning technology that has been developed in recent years for various purposes, including, for example, to locate or position emergency vehicles to improve response time to emergency calls, and to improve fleet management (e.g., for taxi companies and the like).

In general, the mobile positioning techniques most preferred for use in the present invention include those having a high resolution, inasmuch as the higher the resolution, the easier it will be to detect a movement of the MS. Examples of the best techniques available today include those using GPS (Global Positioning System) assisted mobile positioning (see, for example, U.S. Pat. No. 6,070,078), and those using triangulation (see, for example, U.S. Pat. No. 6,006,097). Other examples of mobile positioning techniques that are known in the art, as well as other known procedures for detecting that an MS has changed its position, are described in U.S. patent application Ser. No. 09/280,233 filed on Mar. 29, 2000, and assigned to Telefonaktiebolaget L M Ericsson (publ), and incorporated herein by reference.

Even though movement of the MS is typically a good indication that the called party may be available to answer the call, it is possible that the called party may not be near the MS even though it has moved. According to embodiments of the invention, further inputs may be considered, in addition to determining once that the MS has moved, before initiating a callback attempt in order to increase the confidence level for success. In this way, the disturbance of the calling party is also minimized. Such further inputs may be the time since the last callback attempt was made or the frequency of a plurality of earlier callback attempts. If several unsuccessful callback attempts have been made after detecting MS movement, it is better to wait a little longer until the next attempt is made. A further possible input to consider may also be to use an MS movement detection method different from the first one used, or to use the same method more than once.

An important aspect of the present invention is that the call completion procedure can be provided as a new subscription service to subscribers, and thus serve as a new source of revenue to service providers, in addition to providing increased revenue because more calls will be completed. The service can also be provided to either the called party or the calling party.

Also, as in many subscription services, a variety of options can be included in the service as determined by the provider and/or by the subscriber. Such options can include, for example, limiting the frequency and/or number of attempts to complete the call, providing the ability to cancel at any time the request to complete a call, and specifying the period of time that the service remains active. Particularly when the calling party is provided with the service, other options may include providing the calling party with the ability to check the details and status of uncompleted calls, requesting whether or not the calling party wants the callback service activated when a call receives no response, and the like.

In general, the present invention provides a new call completion service for completing a call to an MS once no response is encountered. The new service reduces the time it takes to complete a call once a no response situation is encountered; and, generally, increases the likelihood that the call will be completed. The service, accordingly, will result in an increased number of completed calls, a potential for increased revenue by the service provider and greater convenience to the subscriber.

The above and further advantages, objects and features of the invention will become apparent hereinafter in conjunction with the following detailed description of presently preferred embodiments thereof.

DETAILED DESCRIPTION OF PRESENTLY PREFERRED EMBODIMENTS

Figure 1:
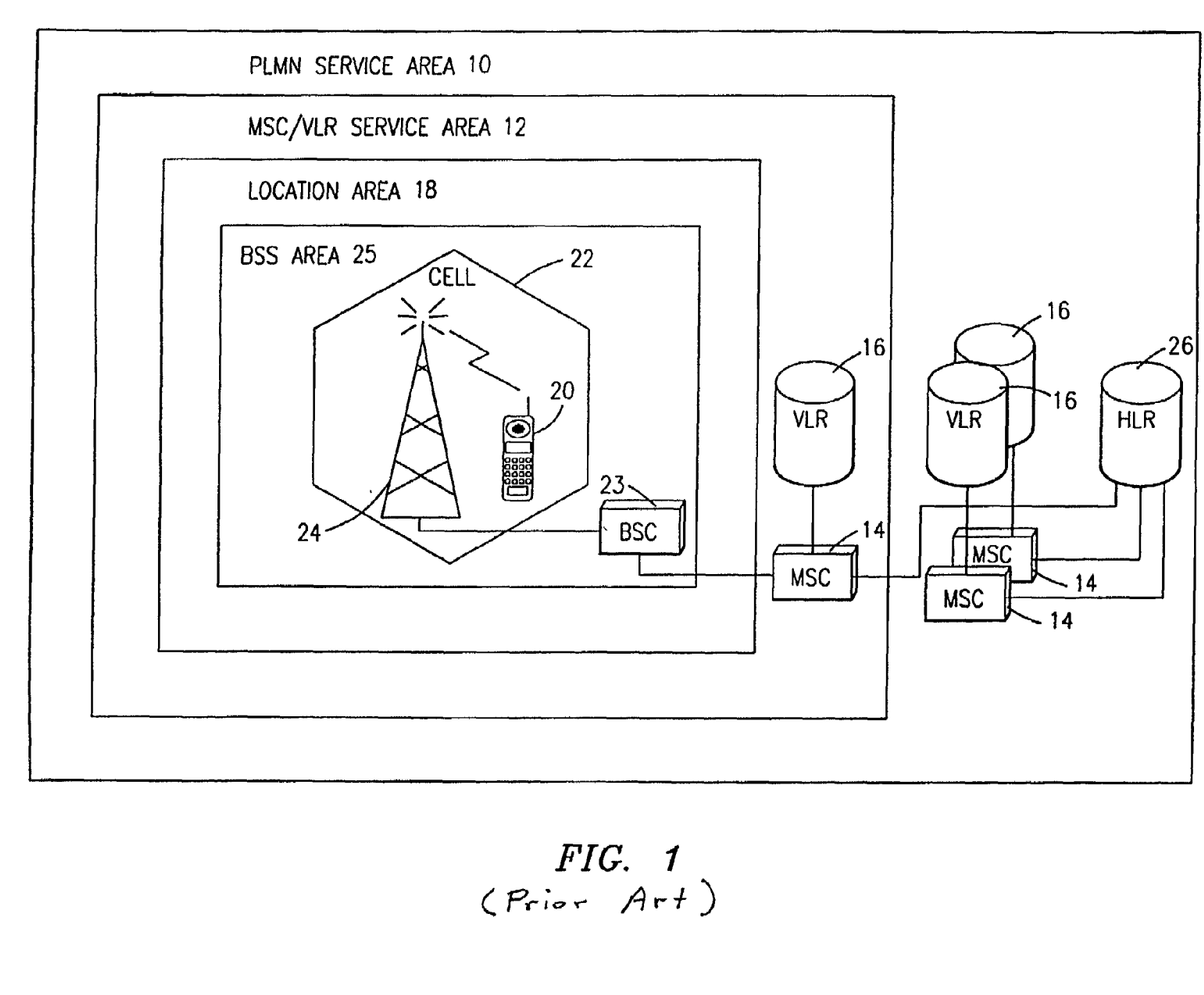
FIG. 1 is a block diagram illustrating a conventional cellular network to assist in explaining the present invention.

FIG. 1 schematically illustrates a conventional cellular network to assist in explaining the present invention. More particularly, FIG. 1 illustrates a Public Land Mobile Network (PLMN) 10, such as Global System for Mobile Communications (GSM). Although a GSM system is described herein, it should be understood that the service could be used in any other PLMN system such as any TDMA system (e.g., TDMA IS-136, PDC, GPRS, etc.), any CDMA system (e.g., IS-95, W-CDMA), any analog system (e.g., AMPS) or any other indoor or private mobile telecommunications system (e.g., DECT-systems).

The network 10 is composed of a plurality of areas 12, each with a Mobile Switching Center (MSC) 14 and an integrated Visitor Location Register (VLR) 16 therein. The MSC/VLR areas 12, in turn, include a plurality of location areas (LA) 18, which are defined as that part of a given MSC/VLR area 12 in which a mobile station (MS) 20 may move freely without having to send update location information to the MSC/VLR that controls the LA 18. Each LA 18 is further divided into a plurality of cells 22. The MS 20 is the physical equipment, e.g., a car phone or other portable phone, used by mobile subscribers to communicate with the cellular network 10, each other, and with users outside the subscribed network, both wireline and wireless.

The MSC 14 is in contact with at least one Base Station Controller (BSC) 23, which, in turn, is in contact with at least one Base Transceiver Station (BTS) 24. The BTS is the physical equipment, illustrated as a radio tower in FIG. 1, that provides radio coverage to the cell 22 for which it is responsible. The BSC 23 may be connected to several BTSs 24, and may be implemented as a stand-alone node or integrated with the MSC 14. In any event, the BSC 23 and BTS 24 components as a whole are generally referred to as a Base Station System (BSS) 25. It should also be noted that the BSC 23 functionality can be included within the MSC 14 instead of being implemented as a separate node as shown in FIG. 1.

As shown in FIG. 1, the PLMN Service Area or cellular network 10 further includes a Home Location Register (HLR) 26, which is a database maintaining all subscriber information such as user profiles, current location information, International Mobile Subscriber Identity (IMSI) numbers, and other administrative information for subscribers registered within the PLMN 10. The HLR 26 may be co-located with a given MSC 14, integrated with the MSC 14, or can service multiple MSCs as is shown in FIG. 1.

The VLR 16 is a database containing information about all the mobile stations 20 currently located within the MSC/VLR area 12. If an MS roams into a new MSC/VLR area, the VLR connected to that MSC will request data about that MS from its home HLR database 26 (simultaneously informing the HLR 26 about the current location of the MS 20). Accordingly, if the user of the MS 20 then wants to make a call, the local VLR will have the requisite information without having to interrogate the home HLR 26. In this manner generally, the VLR and HLR databases, respectively, contain various subscriber information associated with a given MS 20.

Figure 2:
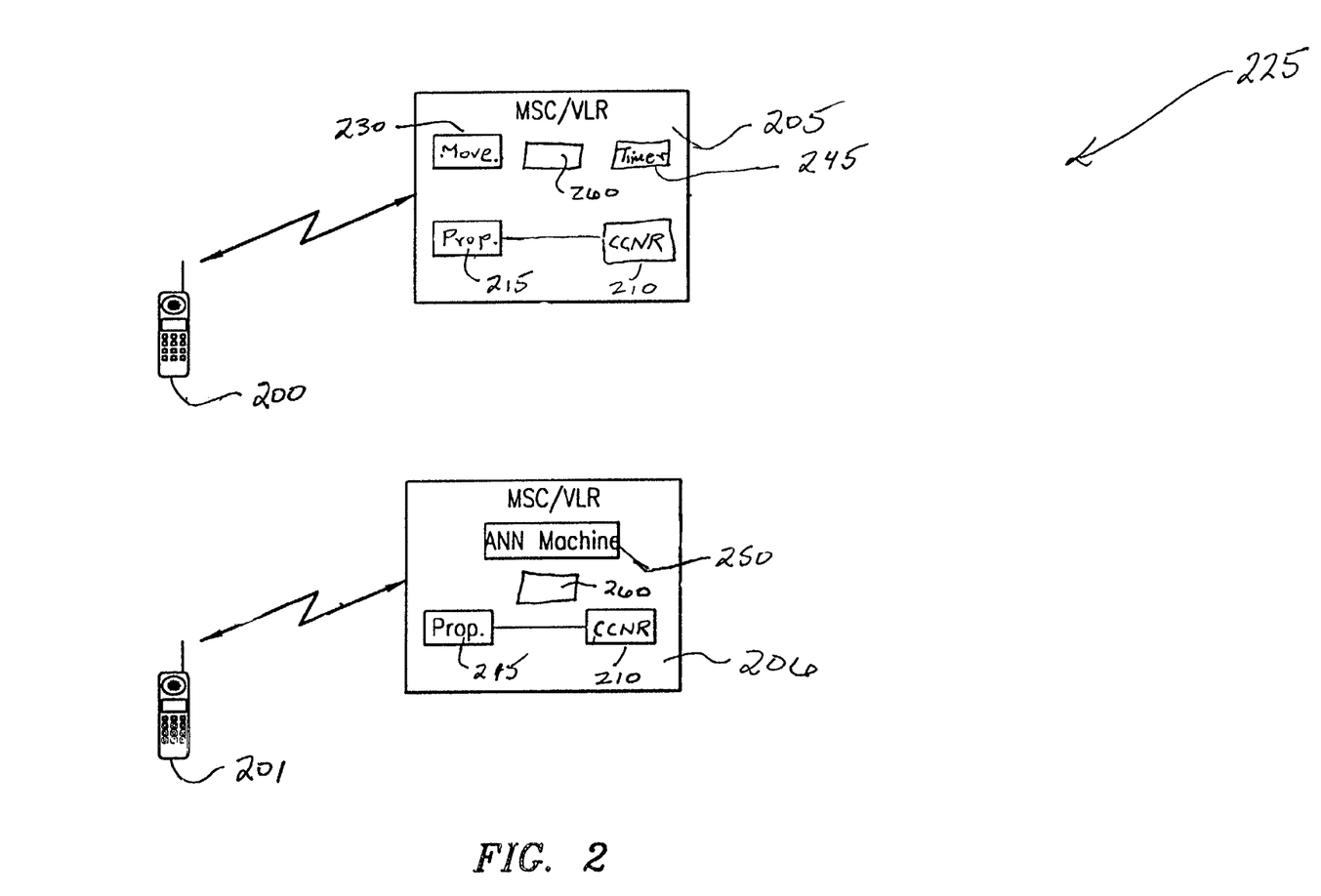
FIG. 2 is a block diagram schematically illustrating an apparatus for effecting a callback on no response according to a presently preferred embodiment of the invention.
Figure 3:
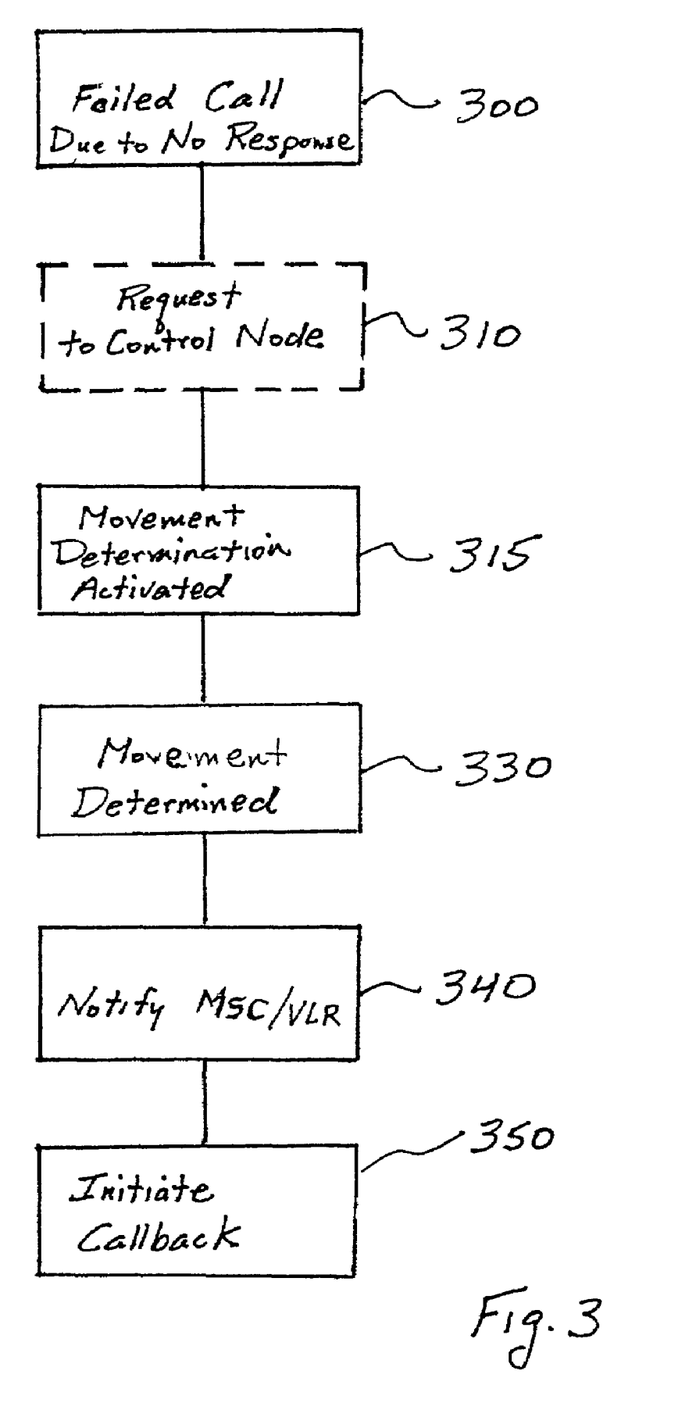
FIG. 3 is a flow chart illustrating the steps for effecting the callback on no response according to a presently preferred embodiment of the invention.

FIG. 2 is a block diagram illustrating an apparatus (generally designated by reference number 225) for effecting a callback on no response according to a presently preferred embodiment of the invention; and will be described in conjunction with FIG. 3 which is a flow chart illustrating the steps of the procedure for effecting the callback on no response.

FIG. 2 illustrates a mobile station (MS) 200 of a called party and a calling unit 201 of a calling party. The calling unit 201 may be a mobile station as illustrated in the Fig., and as described hereinafter; or it may be a telephone in a wireline system. In the following description, it is assumed that the calling party has made an attempt to call the called party's MS 200 from calling unit 201; and it is further assumed that the call attempt has failed due to no response by the called party, i.e., the called party did not answer the call made by the calling party (step 300 in FIG. 3). In addition, it is assumed that either the calling party or the called party subscribes to or is otherwise provided with a callback on no response feature. This is shown in FIG. 2 by the CCNR (Call Completion on No Reply) block 210 within the MSC/VLRs serving the called and calling MSs, respectively.

In this regard, inasmuch as the call completion on no response feature is contemplated as being provided as a subscription service, the subscribing MS must have a subscriber property 215 associated with it that identifies it as being capable of requesting activation of the callback on no response feature 210. For example, when the calling MS 201 first enters the area associated with its respective MSC/VLR 206, this property can be downloaded to the MSC/VLR 206 from a subscriber record within the HLR associated with the MS 201. Similarly, when the called MS 200 first enters into the area associated with its respective MSC/VLR 205, this property can be downloaded to the MSC/VLR 205 from a subscriber record within the HLR associated with the called MS 200.

The MSC/VLR 205 of the called MS 200 also includes a movement determination unit 230, and when the call is not completed due to no response (step 300), the movement determination unit 230 is activated (step 315) to monitor the MS 200 for movement. If it is the calling party that is provided with the callback on no response feature, a request will first be sent from the MSC/VLR 206 responsible for MS 201 to the MSC/VLR 205 responsible for the called MS 200 to activate the unit 230 (this request is shown as a dashed block 310 in FIG. 3).

When movement of the called MS 200 is determined to have occurred (step 330), the MSC/VLR 205 is notified (step 340) and starts processing the callback in an effort to complete the original uncompleted call (step 350). The call completion is performed by the MSC/VLR, when movement of the MS 200 has been detected, by informing the node responsible for the control of call completion attempts. The node responsible for the call completion (in the case of CCNR or call completion on busy (CCB), for example) would typically be the GMSC (gateway). Specific procedures by which the callback may be accomplished are well-known to those skilled in the art; and, therefore, are not described herein. In any event, the present invention is not limited to any particular type of callback procedure.

As mentioned previously, in a callback on no response procedure, it is necessary to observe the status of the called party in order to determine when he becomes available to complete the call. In existing systems, this is typically accomplished by monitoring when the called party has either just placed or just received another call, as this is a good indication that the called party is available to complete the callback. As also indicated above, however, since it may be some time before the called party uses his phone or MS, the call may not be completed until then.

The present invention, on the other hand, recognizes that the main reason why a called party does not answer a call on a mobile station is because the party cannot reach the MS while alerting is on or because the party is not within hearing distance. In view of such circumstances, the present invention also recognizes that if, after a call to an MS has failed because of no response, the MS is determined to have moved, there is a substantial possibility that the called party has moved the MS and, therefore, that he is now available to complete the call.

Therefore, in accordance with the present invention, movement determination unit 230 is provided in the MSC/VLR 205 associated with the called party's MS 200 to monitor the movement of the MS 200 once a call that is awaiting completion due to no response has been encountered; and when such movement has been determined to have occurred, the callback procedure is initiated.

The present invention contemplates that the determination of movement can be accomplished in various ways; however, in general, the determination according to presently preferred embodiments involves detecting that the mobile station has changed its location or position. According to presently most preferred embodiments, the detection utilizes mobile positioning technology that has been developed in recent years for various applications..

A variety of mobile positioning techniques have been developed including those disclosed in copending U.S. patent application Ser. No. 09/280,233 referred to previously. Any of these and other techniques may be used in the present invention, and the specific technique used depends generally on the resolution desired; i.e., on the amount of movement of the mobile station desired before making the determination that the mobile station has actually moved.

The presently most preferred MS positioning techniques are those having a high resolution inasmuch as the better the resolution, the easier it will be to detect the movement of the MS. The best techniques today are to use Global Positioning Systems (GPS) assisted mobile positioning. This could be done, for example, by having a GPS receiver in the MS and/or by having GPS receivers in the base stations (see, for example, U.S. Pat. No. 6,070,078). Another mobile positioning technique is to use triangulation (see for example, U.S. Pat. No. 6,006,097). Triangulation means measuring signals transmitted from the MS in, at least, three different base stations. The time it takes for the signals to travel to the different base stations from the MS is measured, and from these measurements, the distance of the MS from the different base stations, and consequently its position, can be measured. In general, these and other mobile positioning techniques are well-known to those skilled in the art and need not be described in any detail herein.

Basically, any movement detection technique could be used in the present invention, as long as the detection of movement of the MS can be measured when the MS is in idle mode, i.e., when it is not involved in any ongoing communication with the BS. This is applicable to both mobile stations that are camped on circuit switched or packet switched radio channels.

In addition to mobile positioning technologies as described above, other procedures that may also be used to detect that the MS has changed its position include, but are not limited to:

1. The mobile station performs a periodic registration in a cell different from where the mobile station was located when the caller did not receive a reply;

2. The mobile station performs a location registration update (i.e., the mobile station has moved to a new LA);

3. By paging the mobile station (periodically or for other specific reasons, e.g., SMS delivery) in the cell it was originally located in. No response from the mobile station is an indication that it has moved elsewhere. In this embodiment, more than one page without response may be needed to increase the confidence in the indication that the mobile station is not in the original cell, and confirmation that the mobile station has moved may be obtained by paging other cells;

Each of the above techniques 1–3 describe relatively coarse techniques for finding out if the mobile station's position has changed inasmuch as it can only be determined if the MS has changed cell or location area (and consequently has moved). If a shorter distance determination is desired, then differences in received signal strength values can be used.

Signal strength measurements could also be used to determine whether the mobile station has moved when on the border of a cell or whether the mobile station has camped in another cell without probably moving.

Irrespective of the mobile positioning technique utilized, and it is not intended to limit the invention to any particular technique, once the mobile station is determined to have moved, the MSC/VLR 205 informs the node responsible for establishing the call so that a callback may be made in an effort to complete the call.

In general, the monitoring of the called MS 200 to determine if it has moved will be done on a periodic basis as determined by the MSC/VLR 205.

Figure 4:
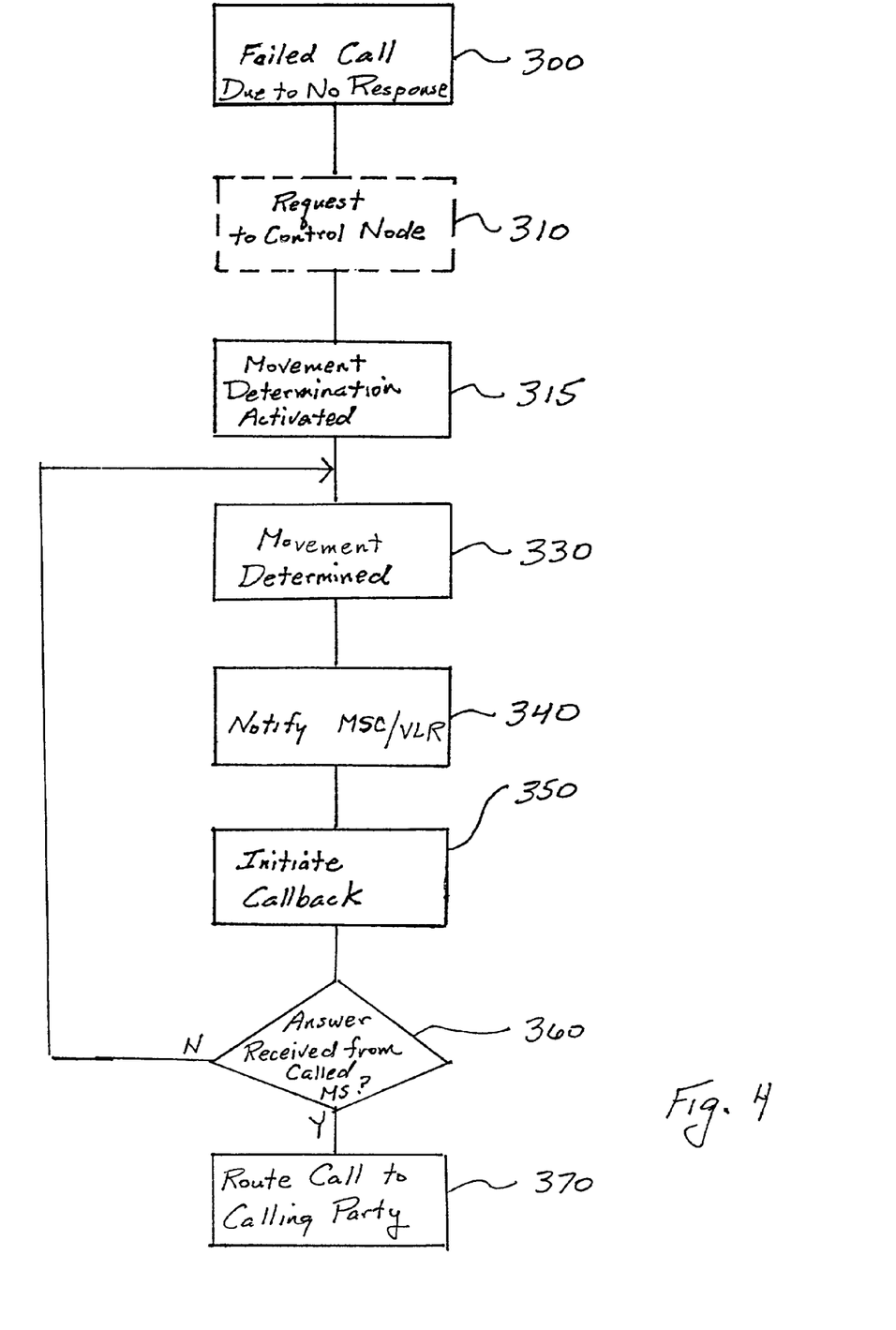
FIGS. 4 and 5 are flow charts illustrating alternative embodiments of the present invention.

Once it is determined that the mobile station has moved, an attempt can be made to complete the call as indicated above. It is possible, however, that the called party will still not hear the MS even though it has moved. For example, this could occur when the called party has left his MS 200 on a seat in a moving train and moved to a different location on the train. In view of the possibility that the MS can move without the called party being present, in accordance with an alternative embodiment of the invention as illustrated in FIG. 4, first receiving an answer from the called MS 200 could be required in step 360 before routing the call to the original calling MS 201, step 370. This mode will also help to minimize the disturbance on the original calling party.

Figure 5:
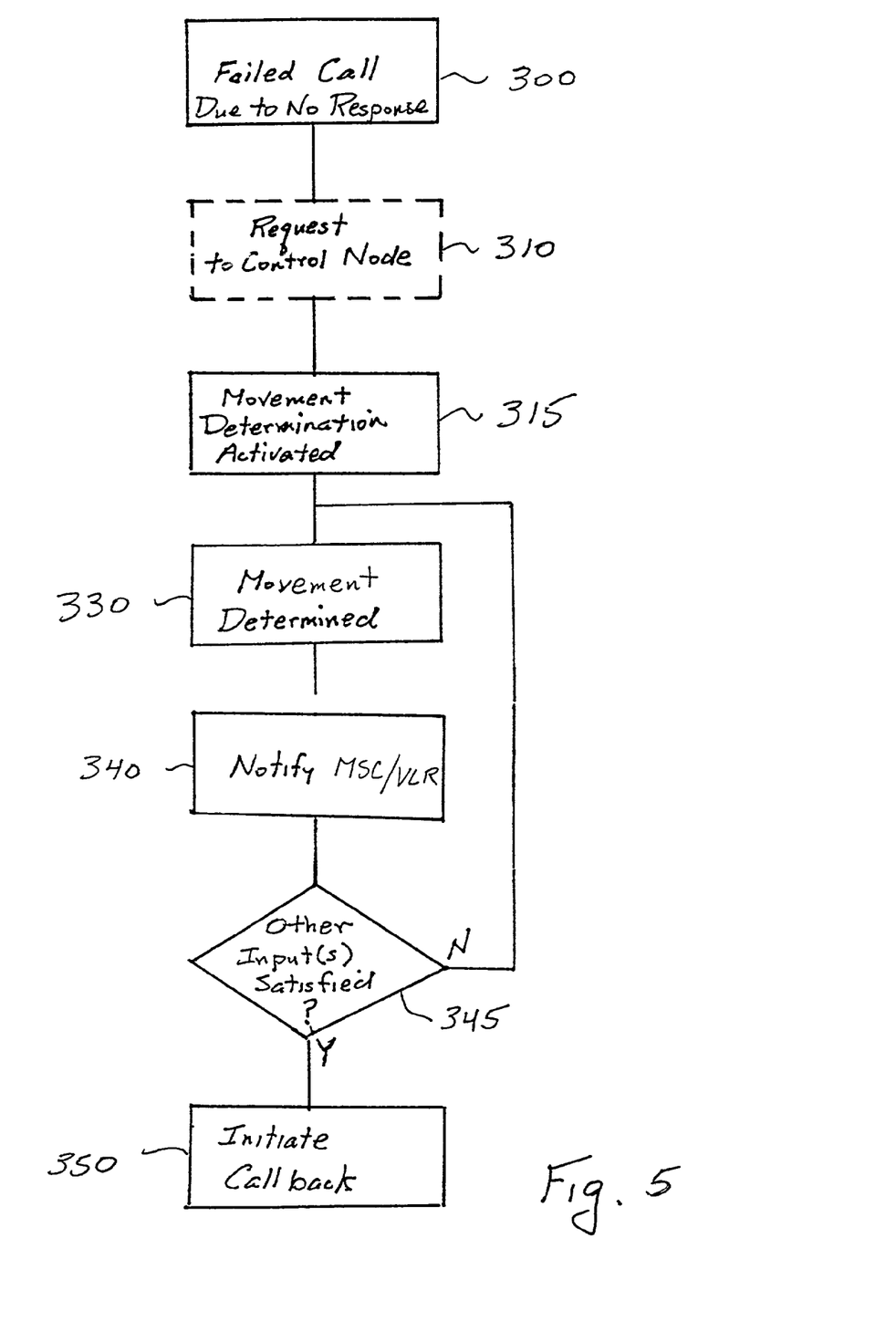

According to further embodiments of the invention, a first determination that the called MS has moved can be treated as only one of two or more inputs into the decision to initiate the callback procedure. Further such inputs may be, for example, other MS movement detection methods. This is illustrated in FIG. 5 wherein before initiating the callback attempt at step 350, one or more inputs must be satisfied as shown in block 345. If not, the process goes back to determining step 330, preferably after waiting a period of time.

The need for a plurality of detection methods, as described above, would exist in the case if the specific method used for the determination of the movement of the MS involves a coarser method than mobile positioning (e.g., the methods 1–3 described above). In such circumstances, it might be considered to use more than one method to determine that the mobile station has moved or to determine that the called party is available for the callback. Also, the selected determination method can simply be repeated to improve the confidence that the MS has moved.

It is also contemplated by the present invention that the callback service could include various restrictions or options that can be provided by the service provider or that can be selected by the subscriber. For example, a time limit can be set after which the callback feature will be canceled. This is illustrated in FIG. 2 by timer 245 in MSC/VLR 205. Also, a limit can be placed on the number of call back attempts or the frequency of the attempts that are made after movement is determined to have occurred and completion of the call is still not made. Also, if desired, a procedure can be provided whereby the calling party is advised that the call is now capable of being completed even if the party is on another call so that he may interrupt the current call if he desires.

Yet other possible features include the ability to check the details and status of uncompleted calls, the ability to cancel at any time the request for completion of uncompleted calls and the ability to activate or deactivate the service whenever desired. In general, the possible provision of these options or restrictions is illustrated by blocks 260 in FIG. 2.

If it is the calling party that is provided with the callback on no response feature, the system can also include the ability to ask the calling party if he wishes the feature activated when the call has not been completed. In this regard, the MSC/VLR 206 of the calling party accesses an announcement machine 250 asking the calling party whether he would like to activate the feature. The announcement from the announcement machine could be, for example, an oral message or a text prompt. The calling party can respond, for example, by pressing one or more keys on his MS 201. If he does not wish to activate the service, the call is disconnected. If he does wish to activate the service, an appropriate message is sent to MSC/VLR 205.

In general, it is contemplated that the callback on no response feature according to the present invention be incorporated into a call completion service to provide an additional source of revenue to the service provider and to provide an additional service and added convenience to the subscriber. The call completion service according to the invention will generally result in more calls being completed and in their being completed in less time.

While what has been described constitutes presently preferred embodiments of the invention, it should be understood that the invention could take numerous other forms. Accordingly, it should be recognized that the invention should be limited only insofar as is required by the scope of the following claims.

What is claimed is:

1. A method for completing a call from a calling party to a mobile station (MS) of a called party that was not previously completed because of no response by the called party, comprising:

sending a request from a Mobile switching center/visitor location register (MSC/VLR) of the calling party to a MSC/VLR of the called party to activate a movement determination unit to monitor the mobile station of the called party; and responsive to monitoring results, one of initiating a callback procedure to the called party to complete the uncompleted call if the MS has moved and canceling said callback procedure if the MS has not moved.

2. The method according to claim 1, further comprising a detecting step for detecting if the MS of the called party has changed its location utilizing mobile positioning technology.

3. The method according to claim 1, wherein prior to the step of initiating a callback, deciding whether a callback should be initiated when it has been determined that the MS of the called party has moved.

4. The method according to claim 3, wherein the deciding step is based on
an input determining that the MS of the called party has moved and
at least one further input indicative that the callback may be successful.

5. The method according to claim 4, wherein said step of determining that the MS of the called party has moved comprises
making a first determination that the MS of the called party has moved, and utilizing the at least one further input for making a second determination that the MS of the called party has moved.

6. The method according to claim 5, wherein said first and second determinations are made by first and second movement determination procedures, respectively.

7. The method according to claim 4, wherein said at least one further input comprises an expiration of a period of time before said callback is initiated.

8. The method according to claim 1, wherein the MS of the called party answers a callback attempt prior to contacting the calling party.

9. The method according to claim 1, wherein said method is provided in a call completion service, and wherein said service is available to either of the called party or the calling party.

10. The method according to claim 1, further comprising:
receiving a call completion request from the calling party before determining whether the called party has moved.

11. The method according to claim 9, wherein if said calling party is subscribed to said service, the method further comprising the step of inquiring if the calling party wants a callback.

12. The method according to claim 1, further comprising canceling the callback procedure if the determining step does not determine that movement has occurred within a set period of time.

13. The method according to claim 10, wherein said determining step includes monitoring the called MS on a periodic basis to determine if it has moved.

14. Apparatus for implementing a callback on no response feature when a call from a calling party to a mobile station (MS) of a called party is not completed due to no response, said apparatus comprising:
a movement determination unit for determining whether the MS of the called party has moved;
means for sending a request from a Mobile switching center/visitor location register (MSC/VLR) of the calling party to a MSC/VLR of the called party to activate the movement determination unit to monitor the mobile station of the called party; and
a callback unit for one of initiating a callback procedure to the called party to complete the uncompleted call if the movement determination unit has determined that the MS has moved and for
canceling said callback procedure if the MS has not moved.

15. The apparatus according to claim 14, wherein said movement determination unit comprises a detection unit for detecting that the MS of the called party has changed its location.

16. The apparatus according to claim 15, wherein said detection unit utilizes mobile positioning technology.

17. A callback service for completing a call from a calling party to a mobile station (MS) of a called party that was not completed due to no response by the called party, said service including:
utilizing a movement determination unit for determining whether the MS of the called party has moved;
sending a request from a Mobile switching center/visitor location register (MSC/VLR) of the calling party to a MSC/VLR of the called party to activate the movement determination unit
a callback unit for initiating a callback procedure between the calling party and the called party to complete the uncompleted call if the movement determination unit has determined that the MS has moved and for canceling said callback procedure if the MS has not moved.

18. The callback service according to claim 17, wherein said. service is available to be subscribed to by either the calling party or the called party.

* * * * *